(12) United States Patent
Secondo

(10) Patent No.: US 6,766,816 B2
(45) Date of Patent: Jul. 27, 2004

(54) COLLAPSIBLE DISPENSING SYSTEM

(75) Inventor: Michael Charles Secondo, New York, NY (US)

(73) Assignee: Hunter Group, Inc., New York, NY (US)

( * ) Notice: Subject to any disclaimer, the term of this patent is extended or adjusted under 35 U.S.C. 154(b) by 136 days.

(21) Appl. No.: 09/970,548

(22) Filed: Oct. 3, 2001

(65) Prior Publication Data

US 2003/0062090 A1 Apr. 3, 2003

(51) Int. Cl.[7] .......................... F16K 15/14; B65D 47/20
(52) U.S. Cl. .......................... 137/1; 137/846; 137/853; 222/1; 222/490; 222/494
(58) Field of Search ................. 137/375–846, 137/848, 853; 251/344; 222/1, 212, 213, 490, 494

(56) References Cited

U.S. PATENT DOCUMENTS

| | | | |
|---|---|---|---|
| 4,561,570 A | * 12/1985 | Zulauf et al. | ............... 222/213 |
| 4,739,906 A | * 4/1988 | LoTurco | ..................... 222/212 |
| 4,919,167 A | * 4/1990 | Manska | ...................... 137/853 |
| 5,080,138 A | 1/1992 | Haviv | |
| 5,080,139 A | 1/1992 | Haviv | |
| 5,092,855 A | 3/1992 | Pardes | |
| RE34,243 E | 5/1993 | Gerber | |
| 5,279,330 A | 1/1994 | Debush | |
| 5,305,783 A | 4/1994 | Debush | |
| 5,305,786 A | 4/1994 | Debush | |
| 5,431,310 A | * 7/1995 | Kanner et al. | ............... 222/212 |
| 5,490,938 A | * 2/1996 | Sawan et al. | ............... 210/651 |
| 5,551,483 A | 9/1996 | Hochstrasser | |
| 5,660,205 A | 8/1997 | Epstein | |
| 5,826,621 A | 10/1998 | Jemmott | |
| 5,836,484 A | 11/1998 | Gerber | |
| 6,325,253 B1 | * 12/2001 | Robinson | ..................... 222/212 |
| 6,386,395 B1 | * 5/2002 | Lunghetti | .................... 222/213 |
| 6,558,686 B1 | * 5/2003 | Darouiche | .................. 424/423 |
| 2002/0012565 A1 | 1/2002 | Sirna et al. | |

FOREIGN PATENT DOCUMENTS

WO    WO 99/55594    * 11/1999

* cited by examiner

Primary Examiner—Ramesh Krishnamurthy
(74) Attorney, Agent, or Firm—Kalow & Springut LLP

(57) ABSTRACT

A collapsible dispensing system for flowable materials is disclosed. A conical one-way valve assembly of coaxially conforming parts is attached to a collapsible container. An enclosing sleeve seals an elastomeric sheath to a valve body. Flowable materials are dispensed under positive pressure without back flow of external gases and contaminants, even after repeated dispensing of container contents. This enables flowable materials that are susceptible to oxidation and contamination to be reformulated without antioxidants and/or preservatives. The collapsible multiple dose dispensing system maintains the integrity and sterility of flowable materials, thereby prolonging product use life. The system takes advantage of a conical design, allowing for quicker, easier and cheaper manufacturing and assembly.

48 Claims, 7 Drawing Sheets

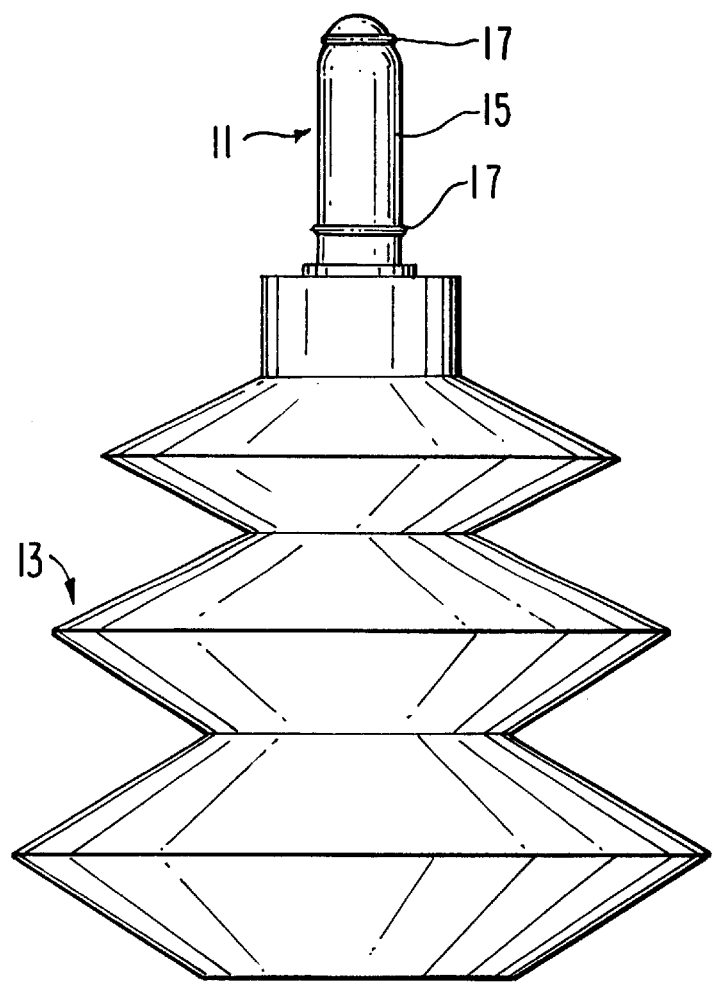
FIG. 1
*Prior Art*
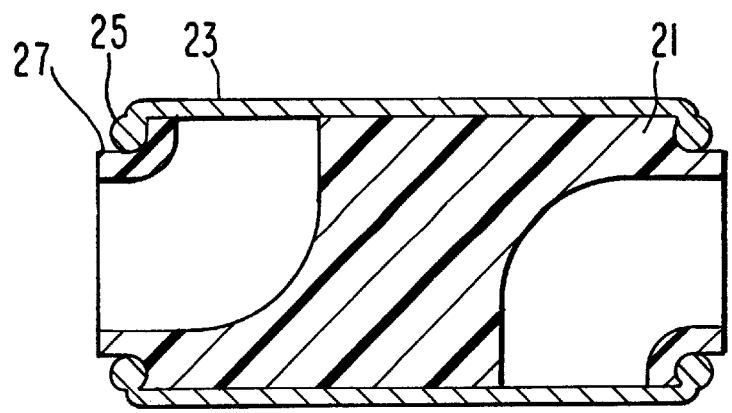
FIG 2 *Prior Art*

FIG.3A *Prior Art*
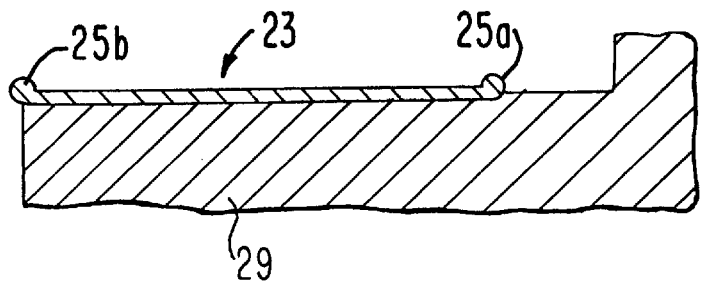
FIG.3B *Prior Art*
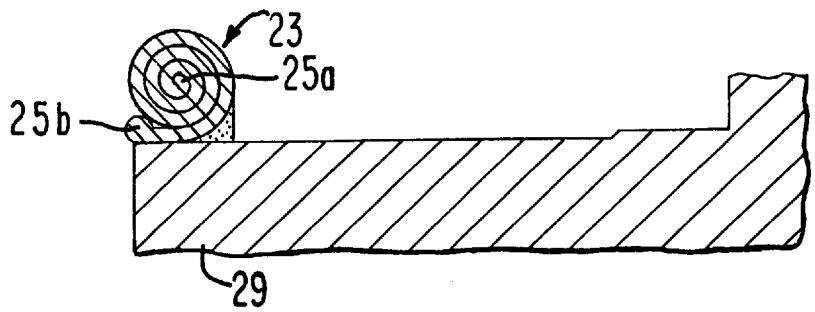
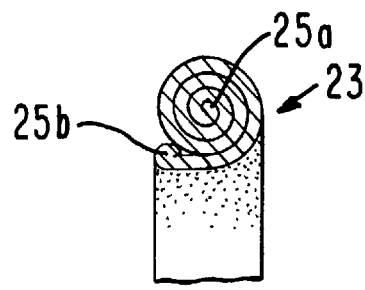
FIG.3C *Prior Art*
FIG.3D *Prior Art*
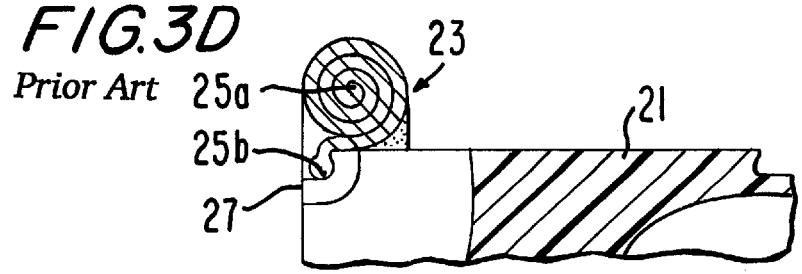

COLLAPSIBLE DISPENSING SYSTEM

CROSS-REFERENCE TO DISCLOSURE DOCUMENTS

This application references and claims the benefit of the filing of Disclosure Document No. 489,311, filed on Feb. 24, 2001 and Disclosure Document No. 491,603, filed on Apr. 4, 2001.

TECHNICAL FIELD OF THE INVENTION

The present invention generally relates to a system for dispensing fluids. More specifically, the present invention relates to a one-way valve assembly for dispensing fluid from a collapsible container. The valve assembly of the present invention also prevents backflow into the container prior to, during and following distribution of the fluid, thereby keeping unwanted items such as contaminants out of the container.

BACKGROUND OF THE PRESENT INVENTION

There is a great need in many industries to dispense fluid products that are susceptible to oxidation and contamination safely. Many products lose their freshness, potency and/or sterility after only a brief period of use. This period or "use life" varies from product to product. Generally, when fluids are dispensed from a valve assembly, the volume of product delivered from the valve assembly is replaced with an equivalent volume of air. Exposure to this ambient air leads to the entry of oxygen into the container and potentially to contaminants in the air such as microorganisms, atmospheric gases, moisture and dust particles. The quality, potency, safety and/or sterility of the remaining product can be compromised by the air and potential contaminants within.

The present invention delivers fluid under positive pressure through a one-way valve from a container that collapses in proportion to the amount of product dispensed. Consequently, air does not enter the dispensing system.

The concept of a one-way valve assembly is not new. One-way valves are used extensively throughout the medical field in complex medical device machinery to dispense flowable products. One-way valves are also being used in aerosol dispensers to dispense flowable products. However, the need for a contamination-safe, propellant-free one-way valve that can easily be manufactured and assembled has long been apparent. As the medical field continues to grow, the need to dispense multiple doses of sterile fluids during surgery, diagnostic testing, ophthalmology and other areas without fear of contamination continues to grow as well. Thus, there exists a need for creating a collapsible dispensing system that is simple to manufacture and assemble for dispensing multiple doses of sterile fluids.

Several one-way valves contain cylindrical cores encompassed by an elastic cylindrical sheath. The core typically has an entrance tube leading to one area of the sheath, and an exit tube leading away from another area of the sheath. The entrance and exit tubes, while enclosed by the sheath, do not interconnect. To dispense liquid, one would apply pressure to expand the sheath, allowing liquid to pass from the entrance tube to the exit tube. Upon release of that pressure, the sheath would contract, thereby sealing the valve and preventing backflow into the container.

For example, U.S. Pat. Nos. RE 34,243; 5,836,484; 5,279, 330; 5,305,783; 5,305,786; 5,080,138; 5,080,139; and 5,092,855 all disclose cylindrical one way valves for dispensing liquids and eliminating backflow of unwanted materials. Some of these, such as U.S. Pat. No. 5,080,138, have an excessive number of parts. All of these, particularly the disc shaped valves in U.S. Pat. Nos. 5,080,139 and 5,279, 330, are unnecessarily difficult to assemble.

Referring to FIG. 1, shown is a dispensing valve assembly for dispensing liquids of different consistencies according to U.S. Pat. No. RE 34,243. Shown is valve assembly 11 containing five pieces. Valve assembly 11 is mounted on flexible container 13 such that fluid will be dispensed when container 13 is compressed. Valve assembly 11 is constructed by stretching sheath 15 over the outside of valve body (not pictured). Sheath 15 is sealed on the outside surface of the valve body by O-rings 17.

The five-piece design disclosed in U.S. Pat. No. RE 34,243, and shown in FIG. 1, has several disadvantages. First, the five-piece design makes the unit costly to manufacture, as at least four distinct units must be manufactured, and each unit must be constructed with precision. The existence of such a five-piece apparatus also necessarily indicates a level of complexity when assembling. Sheath 15 must be stretched over valve body (not pictured) and then secured in place over O-rings 17. This process is difficult to accomplish.

Referring now to FIG. 2, shown is the valve assembly of U.S. Pat. No. 5,305,783. Shown is valve body 21 covered by elastomeric sleeve 23 with O-ring like enlargements 25 at the each end. Elastomeric sleeve 23 is secured to valve body 21 by O-ring like enlargements 25 by forming a seal at reduced diameter ends 27 of valve body 21. This design renders assembly of such a valve difficult.

To illustrate, the steps required to attach elastomeric sleeve 23 onto valve body 21 are shown in FIGS. 3A–3D. Elastomeric sleeve 23 is first formed on molding core pin 29 as shown in FIG. 3A. Elastomeric sleeve 23 must then be rolled up on itself on molding core pin 29 as depicted in FIG. 3B. Molding core pin 29 is then removed as depicted in FIG. 3C. Elastomeric sleeve 23 is then placed on valve body 21 with O-ring like enlargement 25a and elastomeric sleeve 23 is secured to reduced diameter end section 27 of valve body 21 as shown in FIG. 3D. The assembly is completed when elastomeric sleeve 23 is unrolled and O-ring like enlargement 25b secures the reduced diameter end section 27 of the valve body 21 as resulting in the configuration shown in FIG. 2.

This process could be done manually but it would be time consuming. Alternatively, the assembly process could be automated but would involve an unacceptable rate of failure resulting in increased expense.

Referring now to FIG. 4, shown is a valve assembly according to U.S. Pat. No. 5,092,855. Sheath 31 has O-rings 33 at both ends of valve body 35. O-rings 33 secure sheath 31 to valve body 35 when O-rings 33 seat into annular grooves formed on the outside of valve body 35. Sheath 31 is further secured by enclosing sleeve 37 which fits over sheath 31 and valve body 35 and ensures sheath 31 and valve body 35 are sealed. Once again, sheath 31 must be stretched over valve body 35 rendering assembly of such a valve difficult and costly to manufacture on a commercial scale.

Referring next to FIG. 5, shown is a valve assembly according to U.S. Pat. No. 5,305,786. As shown, valve body 41, elastomeric member 43 and cover member 45 are cylindrical. This cylindrical design is a disadvantage during assembly. For the valve assembly to operate as described, the diameter of cylindrical section 47 of valve body 41 must be only slightly smaller than the diameter of cylindrical section 49 of cover member 45. Therefore, insertion of valve body 41 into elastomeric member 43 and subsequently into cover member 45 can tolerate only slight deviations in any direction perpendicular to the axis of the valve.

Referring again to FIG. 1, to assemble a valve assembly such as the one depicted, sheath 15 is typically rolled axially onto a mandrel or support pin and then carefully rolled up from one end toward the other in preparation for placement on valve body (not pictured). Alternatively, sheath 15 can be fitted on arms for lateral expansion with compressed air while the valve body is inserted into sheath 15. In either case, assembly, whether performed manually or by complex machinery, is slow, cumbersome, and sometimes ineffective. Another disadvantage with the design depicted in FIG. 1 is that sheath valve is cylindrical, thereby requiring the inside diameter of the sheath to be marginally smaller than the outside diameter of the valve body in order to maintain the necessary sealing tension of sheath 15 against the valve body. As stated above, the cylindrical design necessarily makes the valve assembly of FIG. 1 difficult and costly to manufacture and assemble.

Referring now to FIG. 6, shown is a multiple dose dispensing system according to U.S. Pat. No. 5,836,484. Shown are dispensing cartridge 51, container 53, delivery block 59 and sheath 55 all contained within housing 57. Delivery block 59 dispenses liquid 61 through sheath 55, and sheath 55 prevents the backflow of contaminants into delivery block 59.

The valve assembly system depicted in FIG. 6 also has several disadvantages. One disadvantage is that for the design to function properly, sheath 55 must stretch over or envelop delivery block 59. While O-rings are not part of this invention, the stretching of sheath 55 onto delivery block 59 is a complicated process which slows manufacturing. Another disadvantage is the necessity of protrusions 63 to keep sheath 55 from shifting, contracting, or falling off of delivery block 59. Further, as before, to ensure that sheath 55 fits tightly on delivery block 59, the diameter of sheath 55 as manufactured must be smaller than the outer diameter of delivery block 59. While this design necessarily ensures a taut fit, it causes grave problems during assembly, when a flexible material must tightly envelop a block with a smaller diameter. Therefore, the complications and costs associated with manufacturing such a design and assembling such a valve can be overbearing in a mass product market.

SUMMARY OF THE INVENTION

The present invention discloses a valve assembly for dispensing flowable materials, wherein said valve assembly comprises a valve body having a longitudinal bore therethrough, an elastomeric sheath having a longitudinal bore therethrough and an enclosing sleeve having a longitudinal bore therethrough, wherein all of said valve body, said elastomeric sheath and said enclosing sleeve are conically shaped, and wherein all of said longitudinal bores of said valve body, said elastomeric sheath and said enclosing sleeve are coaxial.

An object of the present invention is to provide a one-way valve which is easily manufactured. The present invention provides a three-piece system which can be manufactured at a lower cost. The system eliminates the use of O-rings and other methods of keeping the sheath attached to the valve body, and dispenses with other non-essential parts.

Another object of the present invention is to provide a one-way valve which is easily assembled. The present invention has a conical valve body and a conical elastomeric sheath. The conical shape of these two pieces facilitates the lateral enclosure on the outside surface of the valve body, thereby allowing simple assembly of the unit. The present invention also comprises a rigid sleeve laterally enclosing the elastomeric sheath, spaced radially outward from the elastomeric sheath. This design limits the radially outward displacement of the elastomeric sheath thus preventing sheath membrane distortion or ballooning. Therefore the conical valve assembly can be easily manufactured and assembled on a small scale as well as in a mass market.

Yet another object of the present invention is to provide a means for venting the space between the sleeve and the sheath in a one-way valve assembly. By venting the space, air pressure will not build up, and the sheath can expand without unnecessary force and rebound easily into sealing contact with the valve body upon release of pressure.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which:

FIG. 1 shows a dispensing valve assembly for dispensing liquids of different consistencies according to U.S. Pat. No. RE 34,243.

FIG. 2 shows a valve assembly for dispensing liquids according to U.S. Pat. No. 5,305,783.

FIGS. 3A–3D show the steps required to assemble a conventional valve assembly according to U.S. Pat. No. 5,305,783.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details described herein are merely representative, yet in that regard, they are deemed to afford the best embodiment for the purposes of disclosure and to provide a basis for the claims herein which define the scope of the present invention. The following presents a detailed description of a preferred embodiment (as well as some alternative embodiments) of the present invention.

Figure 4:
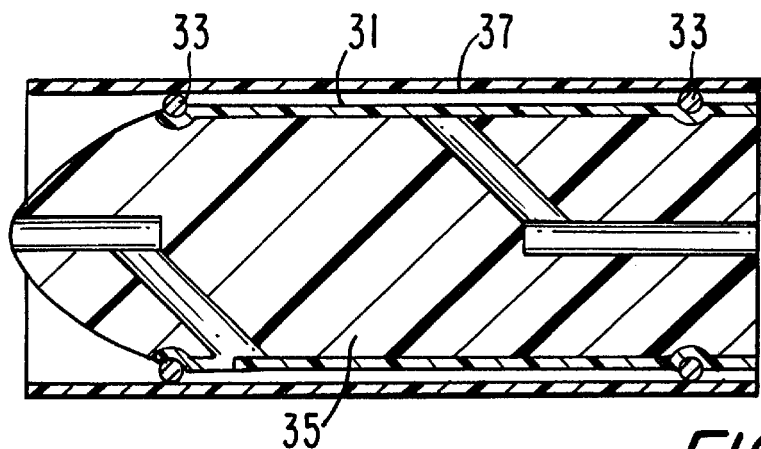
FIG. 4 shows a valve assembly according to U.S. Pat. No. 5,092,855.
Figure 5:
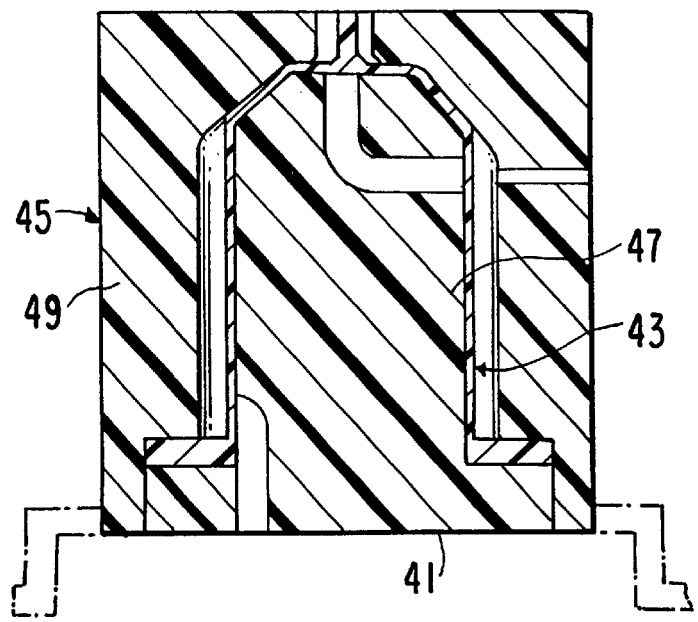
FIG. 5 shows a valve assembly according to U.S. Pat. No. 5,305,786.
Figure 6:
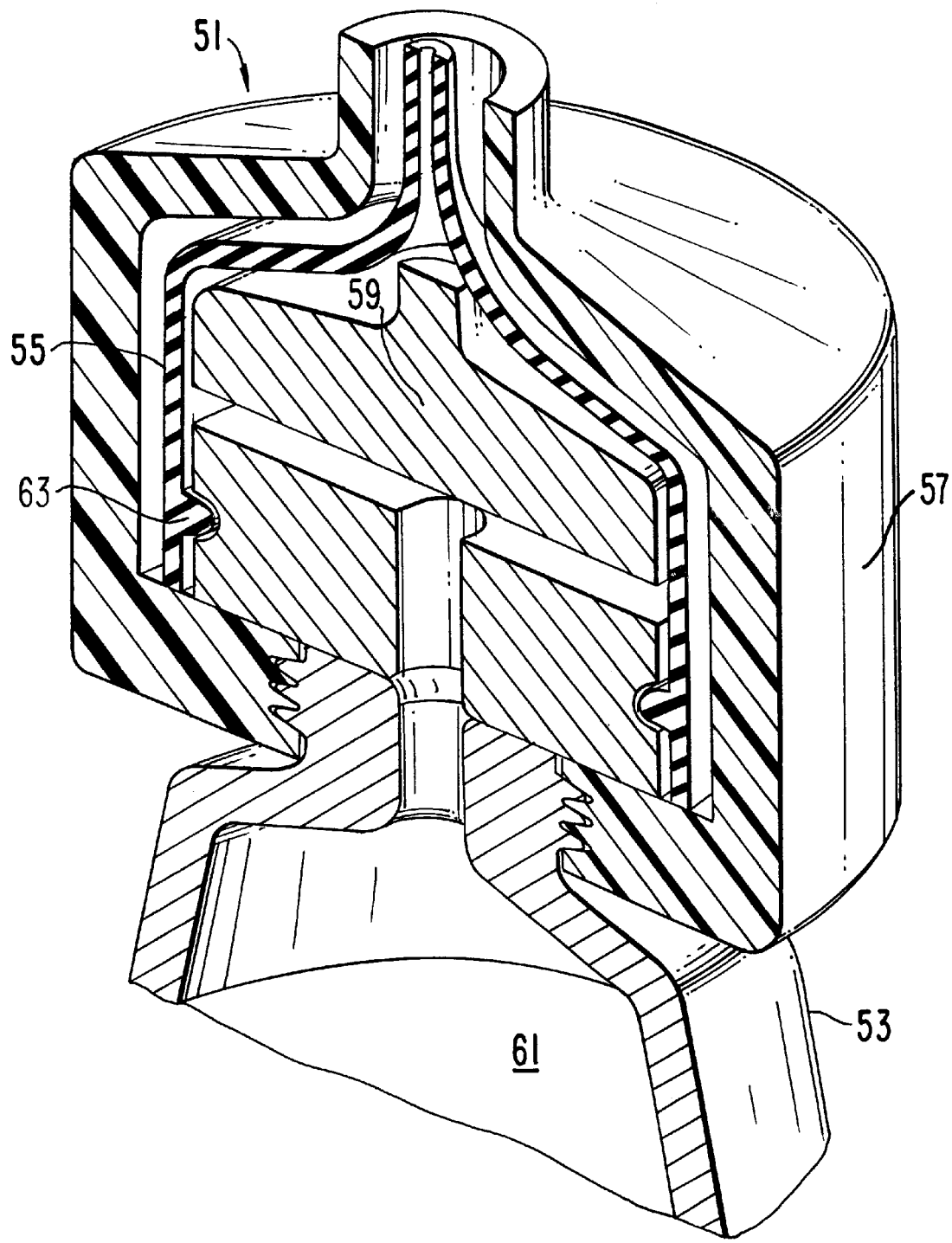
FIG. 6 shows a prior art multiple dose dispensing cartridge for flowable materials according to U.S. Pat. No. 5,836,484.
Figure 7A:
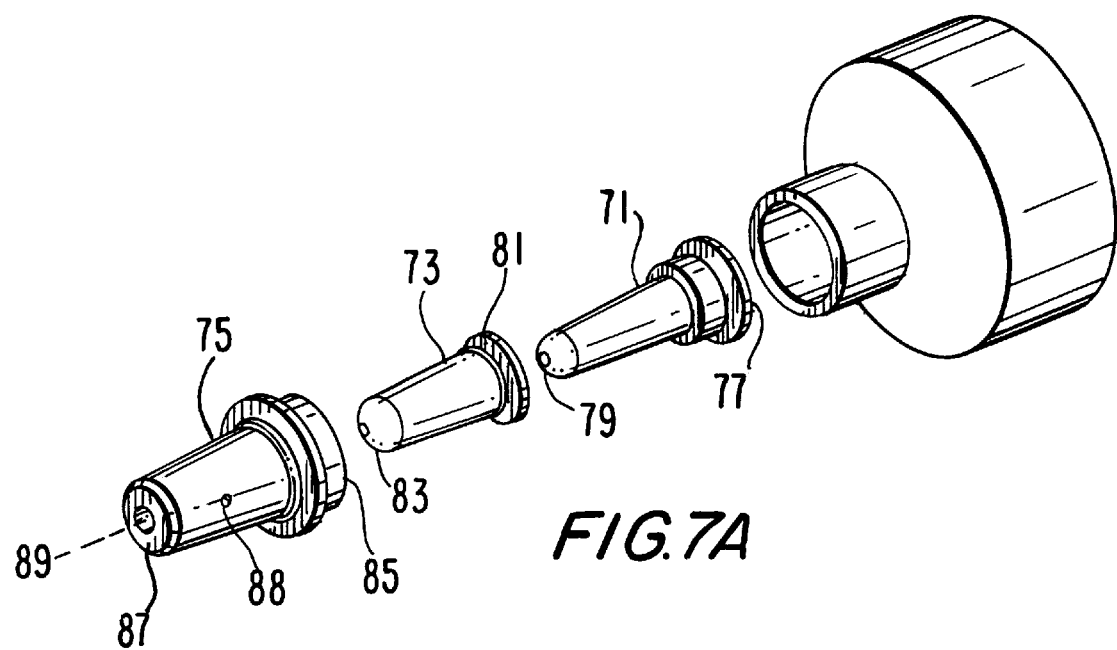
FIG. 7a shows the preferred embodiment of the conical valve assembly according to the present invention.
Figure 7B:
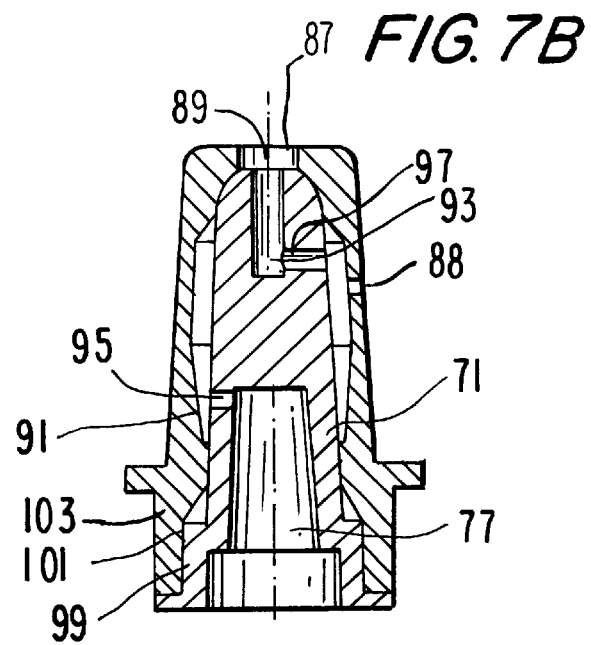
FIG. 7b shows a side cross sectional view of the conical valve assembly according to the preferred embodiment of the present invention.

Referring first to FIGS. 7a–7b, depicted is the preferred embodiment of the conical valve assembly according to its invention. Such a system as shown in FIG. 7a, includes a conical valve body 71, an elastomeric sheath 73 and an enclosing sleeve 75. Each one of these parts is conically shaped. Valve body 71 has inlet end 77 and outlet end 79. Elastomeric sheath 73 has inlet end 81 and outlet end 83. Enclosing sleeve 75 has inlet end 85, outlet end 87 and venting means 88. Inlet ends 77, 81 and 85 are all preferably wider than the corresponding outlet ends 79, 83 and 87 respectively. Valve body 71, elastomeric sheath 73 and enclosing sleeve 75 have longitudinal bore 89 running along the axis of each part respectively. Inlet ends 77, 81 and 85 and corresponding outlet ends 79, 83 and 87 respectively are all preferably positioned along axis 89.

Referring now to the side cross sectional view depicted in FIG. 7b, valve body 71 has an inside conical space that tapers inward along the axis from inlet end 77. Valve body 71 has inlet port 91 and outlet port 93 on the side for inlet channel 95 and outlet channels 97. Valve body 71 has inlet channel 95 toward inlet end 77 that passes from the inlet conical space to the outside surface of valve body 71. Valve body 71 also has outlet channel 97 toward outlet end 87 of the assembled valve pictured in FIG. 7b. Outlet channel 97 transverses the wall of valve body 71 from the outside surface at an angle to axis 89. Each of the parts may also have flange 99, 101 or 103 on their respective inlet ends. Flange 99, 101 or 103 can form a first surface facing in an axial direction facing towards outlet end 87. The conical shape of these parts leads to reduced manufacturing costs and increased ease of assembly.

Previously developed cylindrical valves are extremely sensitive to manufacturing variances in the inside and outside diameters of the component parts. These variances often render assembly impossible. Even when components are optimally manufactured, assembly of cylindrical valve parts is difficult because of the small differences between the diameters of the components. The proposed conical shaped valve eliminates both of these problems. Parts with narrow ends fitting into parts with wide ends obviates the assembly problems discussed above. The conical design is also more forgiving of manufacturing variances in the diameter of component parts. Alternatively, the components may all be wedge shaped with ovular or flat sides. The flat wedge shaped components may be three, four or multi sided. The inwardly tapered nature of the wedge shaped components maintains the above mentioned advantages in manufacturing and assembly albeit to a lesser extent than the conical shape shown in FIGS. 7a and 7b.

Figure 8:
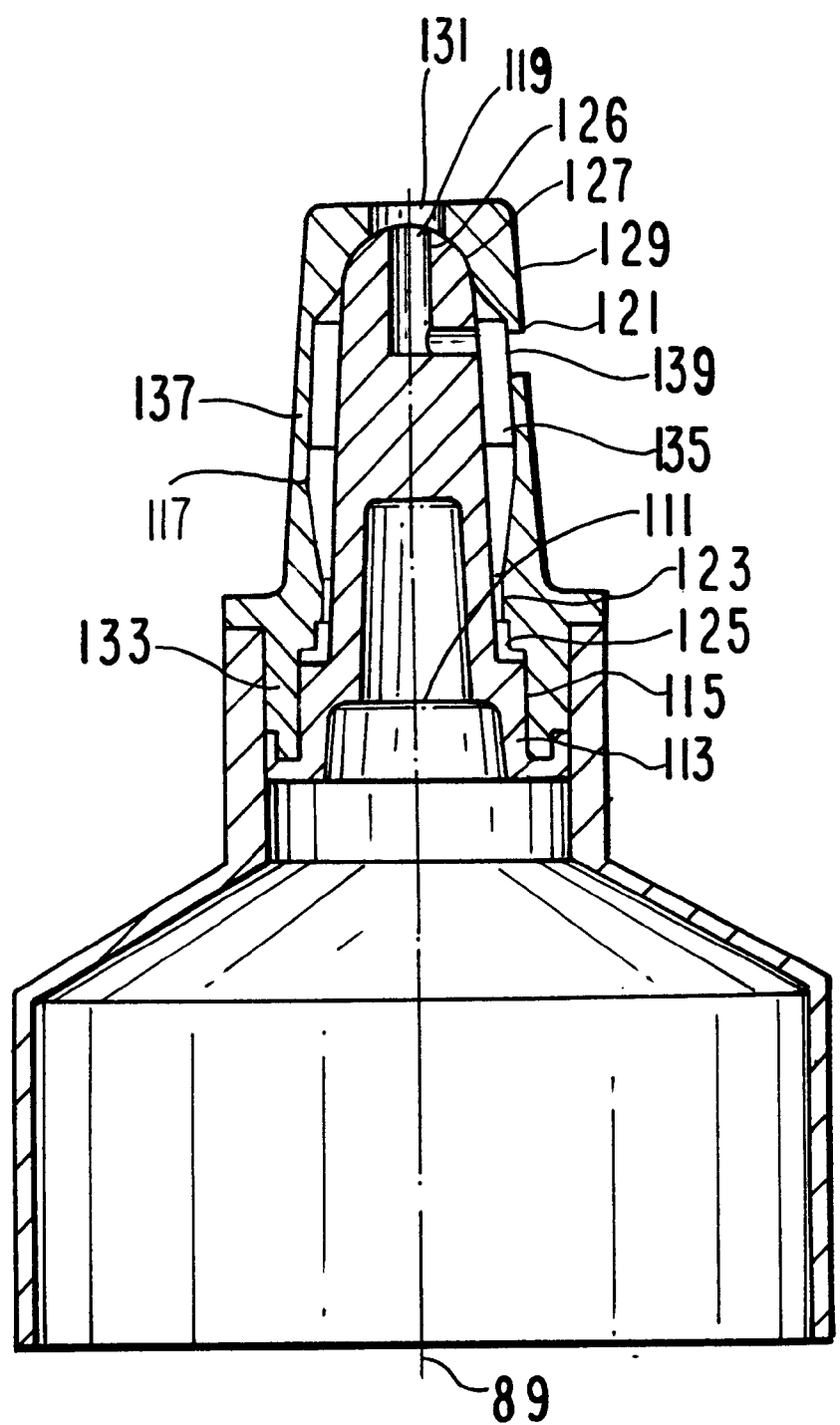
FIG. 8 shows a cross section of the present invention when assembled.

Referring now to FIG. 8, shown is a cross section of the preferred embodiment of the present invention when assembled. Inlet end 111 is the wider end of valve body 113. Inlet end 111 leads to the inside conical space of valve body 113. Valve body 113 has flange 115 on inlet end 111. Inlet channel 117 passes in a perpendicular direction to axis 89 of the valve from the inside conical space of valve body 113 to the outside of valve body 113. Outlet end 119 is at the narrower end of the valve body 113. Outlet channel 121 leads from outlet end 119 for a short distance along the axis of the valve and then turns perpendicular to this axis passing to the outside of the valve body 113. Inlet channel 117 and outlet channel 121 can be modified in number, size, location and design to facilitate the flow of a wide range of fluid viscosities and flow rates. However, the ports for inlet channel 117 and outlet channel 121 are preferably on opposite sides so that the flowable materials can flow along a path that is greater than the length of valve body 113. This enables valve body 113 to be smaller, cheaper and easier to assemble without functional sacrifice. Cylindrical valves with opposed ports are more susceptible to sheath membrane distortion or ballooning, and therefore will exhibit a greater inhibition of fluid flow through as compared with the conical embodiment of the present invention.

Still referring to FIG. 8, valve body 113 fits inside of elastomeric sheath 123. Like valve body 113, elastomeric sheath 123 is conically shaped with flange section 125 at its wider end. Elastomeric sheath 123 also has tapered end section 127 to match with tapered end section 126 of valve body 113. Elastomeric sheath 123, prior to placement over the valve body 113, preferably has an inside diameter smaller than the outside diameter of valve body 113 at inlet end 111. This allows elastomeric sheath 123 to pass easily over outlet end 119 of valve body 113 and then to stretch in order to fit tightly around inlet end 111 of valve body 113. Alternatively, elastomeric sheath 123 can have a gum like grabbing texture to further enhance the fit around valve body 113. In yet another alternative embodiment, the inside surface of elastomeric sheath 123 may be ribbed with slight protrusions which extend in a spiral pattern around the inside surface of elastomeric sheath 123 from the area adjacent to inlet channel 117 to the area adjacent to outlet channel 121. These ribs facilitate the conduction of the fluid from inlet channel 117 to outlet end 119 channel 121. Another alternate embodiment has grooves along the outside surface of valve body 113 for directing the fluid flow. The rib and groove alternatives could interfere with the sealing action of elastomeric sheath 123 against valve body 113, thereby increasing the risk of air and contaminants getting into the system. Therefore, the preferred method of directing fluid flow is through lines of sealing contact with enclosing sleeve 129 along the outside surface of elastomeric sheath 123. Elastomeric sheath 123 can form a closure axially outward from the valve body to prevent back flow through closure 131. Closure 131 can be any one of a number of known closures, such as a duckbill closure, a flattened hollow tube of rubber, which when under pressure will expand to permit fluid flow and contract once the pressure is relieved. Alternatively, outlet end 119 may be fitted with a drop meter in place of the duckbill closure, a hypodermic needle or a nozzle for providing the desired form for the fluid being dispensed including a spray or a stream, or any other closure device. Outlet end 119 can also be configured without a discrete outlet channel inside valve body 113 where fluid flows from inlet end 111 along the exterior surface of valve body 113 and the interior surface of elastomeric sheath 123 to outlet end 119. Enclosing sleeve 129 can be utilized to provide alternative lines of sealing contact to direct the fluid flow through an outlet passageway along the exterior surface of valve body 113 and elastomeric sheath 123 can form closure 131 for such a passageway. This closure can extend axially outward from the outlet end 119.

Both valve body 113 and elastomeric sheath 123 fit inside enclosing sleeve 129. Enclosing sleeve 123, like the other two parts is conical in shape. The wide end of enclosing sleeve 129 has increased diameter section 133 to contain flange section 115 of the valve body 113. On the inside of increased diameter section 133 is a radially inwardly extending shoulder which secures flange section 125 of elastomeric sheath 123. Enclosing sleeve 129 contains expansion chamber 135 in the inside of conical section 137. This space allows elastomeric sheath 123 to expand under pressure coming from inlet channel 117. Enclosing sleeve 129 also features venting means 139 to relieve pressure from the outside of elastomeric sheath 123. Enclosing sleeve 129 can form a seal with elastomeric sheath 123 and the valve body 113 at inlet end 111 and outlet end 119 allowing elastomeric sheath 123 to remain in tight contact with valve body 113 and therefore provide resistance against forces from outside inlet channel 117 and outlet channel 121 and therefore ensure that the flowable materials pass through and out of the valve without backflow of air and contaminants into the container. Enclosing sleeve 129 can be attached to flange section 115 of valve body 113 via any attaching means, including but not limited to, snap fitting, press fitting, heat sealing or welding. Any other method known for joining parts to obtain a leak free connection may be used.

All three components, namely valve body 113, elastomeric sheath 123 and enclosing sleeve 129 may be coated with an anti-microbial agent to prevent contamination of sterile fluids. An inert, non-elutable anti-microbial agent is preferred. Likewise, all three components may be composed of materials which are stable to solutions under a broad pH range and resistant to degradation under exposure to a wide range of organic and aqueous solvents. Preferable materials for valve body 113 and elastomeric sheath 123 have low absorbance, high adhesive surface characteristics that form bonds that maintain a quick and firm sealing tension. Adhesive bonds between surfaces of elastomeric sheath 123 and valve body 113 can be enhanced by the elastic return forces generated when undersized sheaths are placed on oversized valve bodies. Elastomeric sheaths with a greater wall thickness may be expected to provide more elastic restoring force. Elastomeric sheaths with a smaller wall thickness may be expected to provide greater ejection ease. The wall thickness of the sheath is preferably in the range of 8/1000" to 35/1000", and the durometer is preferably in the range of 15–70 (A), although the wall thickness and durometer of the sheath can be adjusted further for optimal sealing and ejection ease. The most preferred materials for elastomeric sheath 123 are silicone, polystyrene butadiene and butyl rubber. The most preferred material for valve body 113 is polysulfone. Other materials, such as polymethacrylate, may be appropriate depending on the nature of the fluid and the application.

Valve body 113, elastomeric sheath 123 and enclosing sleeve 129 are assembled to make the conical valve. This valve is then attached to a container to form the complete dispensing system. The fluid flows into inlet end 111 and passes into the conical space of valve body 113. As more fluid enters this space, the pressure increases and fluid is forced through inlet channel 117. Once the pressure is sufficient, elastomeric sheath 123 deforms and allows fluid in to the expansion chamber 135. As expansion chamber 135 fills, the fluid preferably flows around valve body 113 in a spiral fashion before it passes back into valve body 113 through outlet channel 121 and finally out of the valve through outlet end 119. Back flow and therefore contamination is prevented by closure 131 of elastomeric sheath 129. Further, once the fluid stops flowing through inlet end 111, the pressure in the conical space of valve body 113 is then reduced. This in turn allows elastomeric sheath 123 to collapse and reseal both the inlet channel 117 and outlet channel 121, thereby preventing any back flow through the valve. Venting means 139 in enclosing sleeve 129 prevents any vacuum or pressure from forming within expansion chamber 135 between elastomeric sheath 123 and enclosing sleeve 129.

Previous inventions in this area have been used to protect chemicals, medicines, personal hygiene products and other flowable materials susceptible to contaminations by atmospheric gases and microorganisms. This design with its enhanced ease of manufacturing and assembly will decrease the cost of current applications of one-way valves and extend the use of one way valves to previously prohibited applications. The conical shape of this valve allows the fluid to flow through the valve in a spiral fashion. This increases the length of the fluid flow path which in turn reduces the likelihood of back flowing fluid contaminating the fluid in the container. Moreover, the conical shape of the valve creates a vortex like flow of fluid through the valve therefore increased flow rates are possible relative to other non-conical valves of similar shape and design.

Figure 9A:
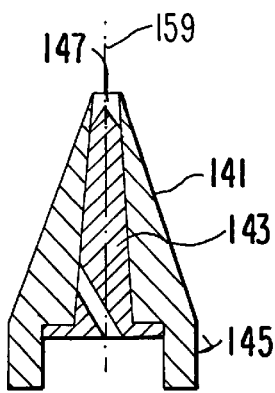
FIGS. 9a–9l depict alternative embodiments of the present invention, including alternative embodiments of the elastomeric sheath according to the present invention.
Figure 9C:
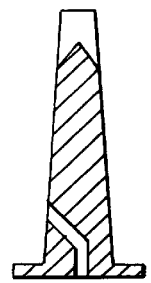
Figure 9D:
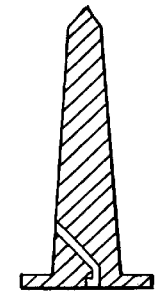
Figure 9B:
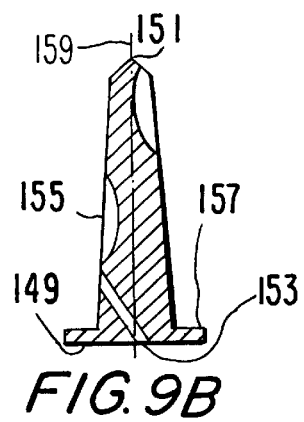
Figure 9E:
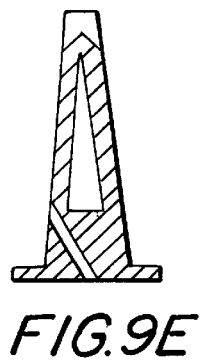
Figure 9F:
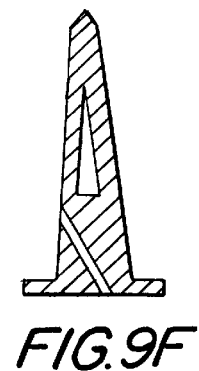
Figure 9I:
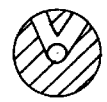
Figure 9J:
Figure 9G:
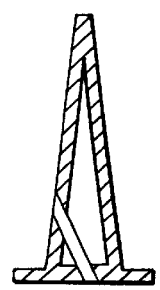
Figure 9H:
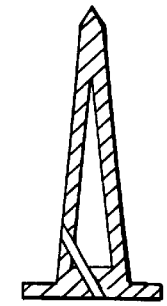
Figure 9K:
Figure 9L:

FIGS. 9a–9l represent alternative embodiments of a one-way conical valve assembly according to the present invention. Referring to FIGS. 9a and 9b, shown are two components, the rigid valve body 141 and elastomeric valve stem 143, both having a conical shape. In contrast to the three component embodiment described above, in this alternative embodiment, elastomeric valve stem 143 is contained within rigid valve body 141 which in turn also serves as an enclosing sleeve. In this configuration of the one-way valve, rigid valve body 141 has an inwardly tapered axially extending bore. Elastomeric valve stem 143 is of a corresponding conical shape, and can have a gum-like grabbing texture. Elastomeric valve stem 143 is compressible and deformable. When assembled, elastomeric valve stem 143 is inside the bore of valve body 141 and maintains sealing contact with the inner surface of valve body 141 as depicted in FIG. 9a. Elastomeric valve stem 143 includes inlet end 149 and outlet end 151 spaced apart in an elongated direction and a conical outside surface extending in an inwardly tapered axial direction between inlet end 145 and outlet end 147 of valve body 141. Inlet end 149 is preferably wider than outlet end 151. Inlet channel 153 is located within elastomeric valve stem 143 and has a first end at inlet end 149 of elastomeric valve stem 143 and second end toward but not at outlet end 151 of said elastomeric valve stem 143. Inlet channel 153 traverses at an angle to the longitudinal axis 159 of the valve. When fluid is to be dispensed from the container, the fluid is pressurized and directed through inlet channel 153 into the space 155 between the inside of valve body 141 and the outside surface of elastomeric valve stem 143. The fluid then passes along the outside surface of elastomeric valve stem 143 to outlet end 147 of the valve body 141. The fluid inwardly compresses elastomeric valve stem 143 transversely of the axial direction moving elastomeric valve stem 143 out of sealing contact with the surface of the bore in valve body 141. When the pressure acting on the fluid is released, elastomeric valve stem 143 rebounds or expands into sealing contact with the inside surface of the bore preventing any back flow into the container.

Valve body 141 and the elastomeric valve stem 143 each have a flange section 109 adjacent to inlet channel 153.

Flange sections 157 form a surface facing in the axial direction toward outlet 151 with a radially outer diameter that includes an axially extending conical section extending from flange section 157 toward outlet 151 and tapering inwardly toward axis 159. The conical shape of elastomeric valve stem 143 and valve body 141 facilitates an easy fit of elastomeric valve stem 143 into inlet end 145 of valve body 141. As mentioned above, the seal between elastomeric valve stem 143 and valve body 141 is improved by compressing elastomeric valve stem 143 against outlet end 147 of valve body 141. Conical valves of this type can be assembled by inserting elastomeric valve stem 143 into valve body 141 through inlet end 145. Outlet end 151 of elastomeric valve stem 143 can be positioned below outlet end 147 of valve body 141, up to outlet end 147 of valve body 141 or through outlet end 147, projecting slightly outwardly from valve body 141. A nozzle located at the outlet end of the valve body can provide the desired form for the fluid being dispensed including a drop, a spray or a stream. Flange section 157 of elastomeric valve stem 143 can be attached to flange section 157 of valve body 141 by any attachment means, including but not limited to press fitting, heat sealing or welding. Any other method known for joining parts to obtain a leak free connection may be used. Valve body 141 is sealed to the neck portion of a container so that the fluid cannot leak out around valve body 141.

Both components, namely valve body 141 and elastomeric valve stem 143 may be coated with an anti-microbial agent to prevent contamination of sterile fluids. Any inert, non-elutable anti-microbial agent is preferred. Likewise, both components may be composed of materials which are stable to solutions under a broad pH range and resistant to degradation under exposure to wide range of organic and aqueous solvents. Preferable materials for valve body 141 and elastomeric valve stem 143 have low absorbance, high adhesive surface characteristics that form bonds that maintain a quick and firm sealing tension combined with ejection ease. Preferable materials for elastomeric valve stem 143 include silicone, polystyrene butadiene and butyl rubber. A preferable material for valve body 141 is polysulfone. Other materials, such as polymethacrylate, may be appropriate depending on the nature of the fluid and the application.

In another alternative embodiment of the present invention, elastomeric valve stem 143 is formed from compressible solid material and is secured in the bore of valve body 141 so that it is not displaced during the dispensing operation.

Other alternative embodiments of elastomeric stem 143 are depicted in FIGS. 9c and 9d. In yet another alternative embodiment, elastomeric valve stem 143 can be formed with a hollow cavity to make it less rigid and increase compressibility. This feature allows the valve to be activated under lower pressure as depicted in FIGS. 9e, 9f, 9g and 9h.

In yet another alternative embodiment, elastomeric valve stem 143 can be formed so that as it is compressed and deforms radially inwardly, an annular flow path is provided between elastomeric valve stem 143 and the surface of the bore in valve body 141. To maintain the sealing tension between elastomeric valve stem 143 and the surface of the bore, axially extending supports can be incorporated into elastomeric valve stem 143 with the supports extending to the surface of the bore. Elastomeric valve stem 143 then deforms radially inwardly only between the supports so that, in place of an annular passageway, individual passageways will be provided between the supports. The supports extend in the manner of spokes. To increase the length of the flow passages through the valve, the supports can be arranged helically whereby the flow passages have a length greater than the axial length of elastomeric valve stem 143 due to the helical arrangement as depicted in FIGS. 9i, 9j, 9k and 9l.

The above described alternative embodiments offer advantages in manufacturing. In addition to the ease of manufacturing and assembly characteristic of the conical shape discussed above, the elastomeric valve stem design offers flexibility in manufacturing. Performance criteria such as flow rate, prevention of back flow, resistance to solvent degradation and pH stability can all be changed by modifying only the elastomeric valve stem. This flexibility can even be extended to the user who can substitute elastomeric valve stems appropriate for each application.

The various features of novelty which characterize the invention are pointed out with particularity in the claims annexed to and forming a part of this disclosure. For a better understanding of the invention and its operating advantages, reference should be made to the drawing and descriptive matter which illustrates and describes preferred embodiments of the invention.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those skilled in the art that numerous changes may be made in such details without departing from the spirit and the principles of the invention. It should be appreciated that the present invention is capable of being embodied in other forms without departing from its essential characteristics.

What is claimed is:

1. A valve assembly for dispensing flowable materials, wherein said valve assembly comprises:
    (a) a valve body having a longitudinal bore therethrough;
    (b) an elastomeric sheath having a longitudinal bore therethrough; and
    (c) an enclosing sleeve having a longitudinal bore therethrough;

wherein all of said valve body, said elastomeric sheath and said enclosing sleeve are conically shaped, and positioned such that said longitudinal bores of said valve body, said elastomeric sheath and said enclosing sleeve are coaxial.

2. A valve assembly according to claim 1, wherein said valve body further comprises inlet and outlet ends.

3. A valve assembly according to claim 2, wherein said inlet end of said valve body is wider than said outlet end of said valve body.

4. A valve assembly according to claim 1, wherein said elastomeric sheath further comprises inlet and outlet ends.

5. A valve assembly according to claim 4, wherein said inlet end of said elastomeric sheath is wider than said outlet end of said elastomeric sheath.

6. A valve assembly according to claim 1, wherein said enclosing sleeve further comprises inlet and outlet ends.

7. A valve assembly according to claim 6, wherein said inlet end of said enclosing sleeve is wider than said outlet end of said enclosing sleeve.

8. A valve assembly according to claim 1, wherein said valve body is positioned within said elastomeric sheath.

9. A valve assembly according to claim 1, wherein said elastomeric sheath is positioned inside said enclosing sleeve.

10. A valve assembly according to claim 1, wherein said elastomeric sheath forms a closure to prevent back flow of materials.

11. A valve assembly according to claim 1, wherein said elastomeric sheath forms a duckbill closure to prevent black flow of materials.

12. A valve assembly according to claim 1, wherein said enclosing sleeve further comprises a venting means to relieve pressure from the outside of said elastomeric sheath.

13. A valve assembly according to claim 1, wherein said valve body, said elastomeric sheath and said enclosing sleeve are coated with an anti-microbial agent to prevent contamination of sterile fluids.

14. The valve assembly of claim 1, wherein said valve body, elastomeric sheath and enclosing sleeve are wedge shaped with ovular sides.

15. The valve assembly of claim 1, wherein said valve body, elastomeric sheath and enclosing sleeve are wedge shaped with flat sides, and wherein said valve body, elastomeric sheath and enclosing sleeve each have a plurality of sides.

16. The valve assembly of claim 1, wherein said valve body comprises a groove and said elastomeric sheath forms a closure over and into said groove to prevent a backflow of materials.

17. A valve assembly for dispensing flowable materials, wherein said valve assembly comprises:
 (a) a valve body having first and second ends and a longitudinal bore therethrough;
 (b) an elastomeric sheath having first and second ends and a longitudinal bore therethrough; and
 (c) an enclosing sleeve having first and second ends and a longitudinal bore therethrough;
 wherein said first end of said valve body is wider than said second end of said valve body, and wherein said first end of said elastomeric sheath is wider than said second end of said elastomeric sheath, and wherein said first end of said enclosing sleeve is wider than said second end of said enclosing sleeve, and wherein all of said valve body, said elastomeric sheath and said enclosing sleeve are conically shaped, and positioned such that said longitudinal bares of said valve body, said elastomeric sheath and said enclosing sleeve are coaxial.

18. A valve assembly according to claim 17, wherein said valve body positioned within said elastomeric sheath.

19. A valve assembly according to claim 17, wherein said elastomeric sheath is positioned inside said enclosing sleeve.

20. The valve assembly of claim 19, wherein said valve body, elastomeric sheath and enclosing sleeve are wedge shaped with ovular sides.

21. The valve assembly of claim 19, wherein said valve body, elastomeric sheath and enclosing sleeve are wedge shaped with flat sides, and wherein said valve body, elastomeric sheath and enclosing sleeve each have a plurality of sides.

22. A valve assembly according to claim 17, wherein said elastomeric sheath forms a duckbill closure to prevent back flow of materials.

23. A valve assembly according to claim 17, wherein said elastomeric sheath forms a duckbill closure to prevent back flow of material.

24. A valve assembly according to claim 17, wherein said valve body, said elastomeric sheath and said enclosing sleeve are coated with an anti-microbial agent to prevent contamination of sterile fluids.

25. The valve assembly of claim 1, wherein said valve body, elastomeric sheath and enclosing sleeve are wedge shaped with ovular sides.

26. A method for dispensing flowable materials while preventing contamination of said flowable materials, said method comprising the steps of:
 (a) distributing flowable materials through a first end of a valve body;
 (b) increasing pressure to deform an elastomeric sheath thereby allowing fluid to enter an expansion chamber;
 (c) passing said flowable materials into said valve body and out through a second end; and
 (d) reducing said pressure to collapse said elatomeric sheath;
 wherein said first end of said valve body is wider than said second end of said valve body, wherein said valve body and said elastomeric sheath are conically shaped and wherein said reduction of said pressure ensures that no contaminants enter said valve body through said second end.

27. The method according to claim 26, wherein said flowable materials in said expansion chamber flow in a spiral fashion prior to passing through said second end of said valve body.

28. A valve assembly for dispensing flowable materials, wherein said valve assembly comprises:
 (a) a valve body having
  (i) a longitudinal bore therethrough, wherein said longitudinal bore of said valve body forms an inlet conical space,
  (ii) an outside surface, and
  (iii) an inlet channel wherein said inlet channel passes from the inlet conical space to the outside surface of said valve body; and
 (b) an elastomeric sheath having a longitudinal bore therethrough;
 wherein said valve body and said elastomeric sheath are conically shaped, and positioned such that said longitudinal bores of said valve body and said elastomeric sheath are coaxial.

29. The valve assembly of claim 28, wherein said valve body further comprises inlet and outlet ends.

30. The valve assembly of claim 29, wherein said inlet end of said valve body is wider than said outlet end of said valve body.

31. The valve assembly of claim 28, said elastomeric sheath further comprises inlet and outlet ends.

32. The valve assembly of claim 28, wherein said inlet end of said elastomeric sheath is wider than said outlet end of said elastomeric sheath.

33. The valve assembly of claim 28, wherein said valve body is positioned within said elastomeric sheath.

34. The valve assembly of claim 33, said valve body and said elastomeric sheath form a closure, and said closure prevents back flow of materials.

35. The valve assembly of claim 28, wherein said valve body and said elastomeric sheath form a duckbill closure, and said duckbill closure prevents back flow of materials.

36. The valve assembly of claim 28, wherein said valve body and elastomeric sheet are wedge shaped with ovular sides.

37. The valve assembly of claim 28, said valve body and elastomeric sheath are wedge shaped with flat sides, and wherein said valve body and elastomeric sheath each have a plurality of sides.

38. The valve assembly of claim 28, wherein said valve body and said elastomeric sheath are coated with an anti-microbial agent.

39. The valve assembly of claim 28, said valve body comprises a groove and said elastomeric sheath forms a closure over and into said groove to prevent a backflow of materials.

40. A valve assembly for dispensing flowable materials, wherein said valve assembly comprises;

(a) a valve body having
  (i) a longitudinal bore therethrough, wherein said longitudinal bore of said valve body forms an inlet conical space,
  (ii) an outside surface, and
  (iii) an inlet channel, wherein said inlet channel passes from the inlet conical suave to the outside surface of said valve body; and; and
(b) an elastomeric sheath having first and second ends and a longitudinal bore therethrough;
wherein said first end of said valve body is wider than said second end of said valve body, and wherein said first end of said elastomeric sheath is wider than said second end of said elastomeric sheath, and wherein said valve body and said elastomeric sheath are conically shaped, and positioned such that said longitudinal bores of said valve body and said elastomeric sheath are coaxial.

41. The valve assembly of claim 40, said valve body is positioned within said elastomeric sheath.

42. The valve assembly, wherein said valve body and said elastomeric sheath form a closure to prevent back flow of materials.

43. The valve assembly of claim 40, said valve body and said elastomeric sheath form a duckbill closure, and said closure prevents back flow of materials.

44. The valve assembly of claim 40, wherein said valve body and elastomeric sheath are wedge shaped with ovular sides.

45. The valve assembly of claim 40, wherein said valve body and elastomeric sheath are wedged shaped with flat sides, and wherein said valve body and elastomeric sheath each have a plurality of sides.

46. The valve assembly of wherein said valve body and said elastomeric sheath are coated with an anti-microbial agent.

47. The valve assembly according to claim 40, wherein said valve body further comprises;
  (a) an inlet port, wherein said inlet port is located on the outside of said valve body, and wherein said inlet channel connects said inlet port and said longitude bore of said valve body;
  (b) an outlet end;
  (c) an outlet port, wherein said outlet port is located on the outside of said valve body; and
  (d) an outlet channel, wherein said outlet channel connects said outlet port and said outlet end of said valve body.

48. A valve assembly comprising the valve assembly of claim 47 and an enclosing sleeve.

* * * * *

UNITED STATES PATENT AND TRADEMARK OFFICE
CERTIFICATE OF CORRECTION

PATENT NO. : 6,766,816 B2
DATED : July 27, 2004
INVENTOR(S) : Michael Secondo

It is certified that error appears in the above-identified patent and that said Letters Patent is hereby corrected as shown below:

Column 11,
Line 2, delete the word "black" and replace it with the word -- back --.
Line 38, delete the word "bares" and replace it with the word -- bores --.
Line 41, delete the phrase "body positioned" and replace it with the phrase -- body is positioned --.
Line 53, delete the term "duckbill".
Line 57, please delete the word "material" and replace it with the -- materials --.
Lines 62-64, delete and replace it with the following claim:
-- 25. A valve assembly according to claim 17, wherein said enclosing sleeve further comprises a venting means to relieve pressure from the outside of said elastomeric sheath. --

Column 12,
Line 25, delete the phrase "channel wherein" and replace it with the phrase -- channel, wherein --.
Line 39, delete the phrase "claim 28, said" and replace it with the phrase -- claim 28, wherein said --.
Line 46, delete the phrase "claim 33, said" and replace it with the phrase -- claim 33, wherein said --
Line 55, delete the phrase "claim 28, said" and replace it with the phrase -- claim 28, wherein said --.
Line 62, delete the phrase "claim 28, said" and replace it with the phrase -- claim 28, wherein said --

Column 13,
Line 7, delete the term "suave" and replace it with the word -- space --.

UNITED STATES PATENT AND TRADEMARK OFFICE
CERTIFICATE OF CORRECTION

PATENT NO. : 6,766,816 B2
DATED : July 27, 2004
INVENTOR(S) : Michael Secondo

It is certified that error appears in the above-identified patent and that said Letters Patent is hereby corrected as shown below:

<u>Column 13, (cont'd),</u>
Line 8, delete "and;"
Line 18, delete the phrase "claim 40, said" and replace it with the phrase -- claim 40, wherein said--.
Line 20, delete the phrase "assembly, wherein" and replace it with the phrase -- assembly of claim 40, wherein --.
Line 23, delete the phrase "claim 40, said" and replace it with the phrase -- claim 40, wherein said --.

<u>Column 14,</u>
Line 7, delete the phrase "of wherein" and replace it with the phrase -- of claim 40, wherein --.

Signed and Sealed this

Twenty-second Day of March, 2005

JON W. DUDAS
*Director of the United States Patent and Trademark Office*